United States Patent

[11] 3,584,738

[72] Inventor Robert S. Wallace
2706 S. Robertson Blvd., Los Angeles, Calif. 90034

[21] Appl. No. 815,938
[22] Filed Apr. 14, 1969
[45] Patented June 15, 1971

[54] CONTAINER STORAGE DEVICE
15 Claims, 10 Drawing Figs.

[52] U.S. Cl. .......... 206/1, 206/52, 211/59, 220/23.6, 220/97, 312/107
[51] Int. Cl. .......... B65d, 21/02 B65d 85/62
[50] Field of Search .......... 206/65 K, 65, 62, 52 F, 72, 1; 220/97, 41, 21, 23.6; 211/59, 41; 312/107

[56] References Cited

UNITED STATES PATENTS

| | | | |
|---|---|---|---|
| 2,086,534 | 7/1937 | Byrne .......... | 220/41 |
| 2,851,188 | 9/1958 | Pavelle .......... | 206/65K |
| 2,906,579 | 9/1959 | Magnenat .......... | 220/41 |
| 3,272,325 | 9/1966 | Schoenmakers .......... | 206/52F |
| 3,283,915 | 11/1966 | Maslow .......... | 220/97 |
| 3,409,143 | 11/1968 | Graeff .......... | 211/59 |
| 3,414,159 | 12/1968 | Murr .......... | 220/41 |
| 3,452,878 | 7/1969 | Smith .......... | 312/107 |

*Primary Examiner*—William T. Dixson, Jr.
*Attorney*—White and Haefliger

ABSTRACT: The disclosure concerns a molded pallet and housing assembly for storing containers, as for example magnetic tape cartridges, enabling pallet stacking and transportation of the containers.

INVENTOR
ROBERT S. WALLACE
BY White & Haefliger

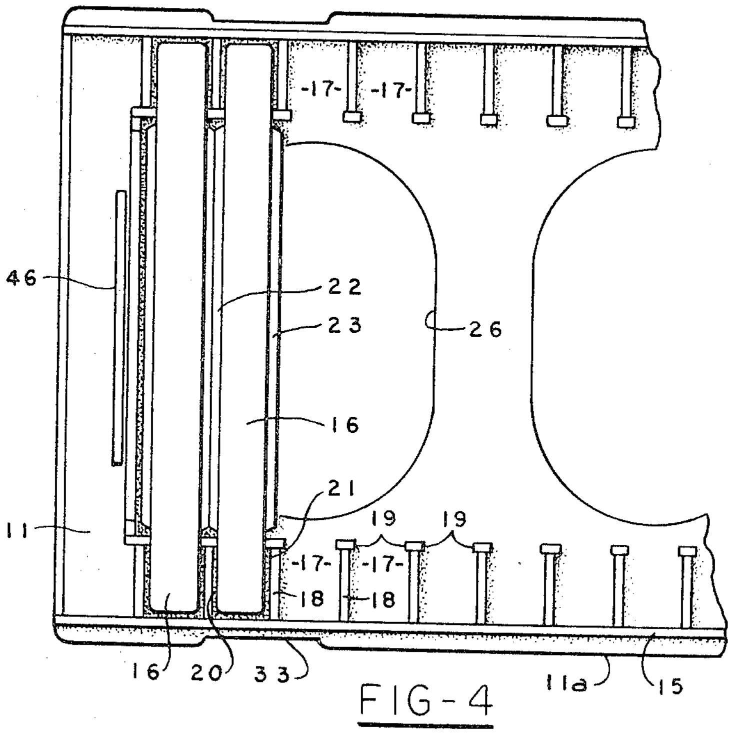
FIG-4
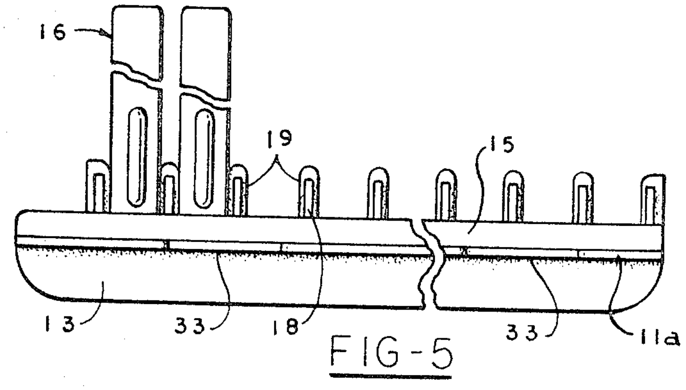
FIG-5
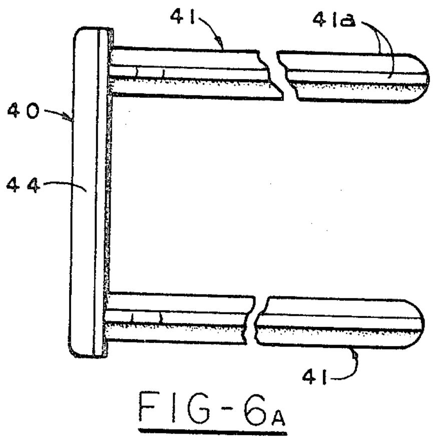
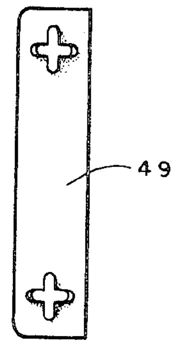
FIG-6A FIG-6B
INVENTOR
ROBERT S. WALLACE
BY White & Haefliger INVENTOR
ROBERT S. WALLACE
BY White & Haefliger

CONTAINER STORAGE DEVICE

BACKGROUND OF THE INVENTION

This invention relates generally to magnetic tape cassette or cartridge storage, and more particularly concerns pallet apparatus for stacking or storing cassettes or containers therefor in condition for ready transportation and accessibility.

Magnetic tape cassettes have recently come into general and extensive use due to their small size, ease of use and long play capacity. However, despite these advantages, certain problems remain. Unlike phonograph records, tape cassettes are relatively thick, irregular and not easily stackable; consequently carriage and storage of accumulated large numbers of cassettes in the home or elsewhere presents considerable difficulty. While boxes have been used for this purpose, they are relatively expensive and no provision has been made to prevent vibration induced free rotation of tape wrapping reels, during cassette transportation in such boxes, creating tape jamming problems.

SUMMARY OF THE INVENTION

It is a major object of the invention to provide an inexpensive pallet device for stacking cassettes in such stored condition as will overcome all of the problems mentioned above, as well as providing a number of unusual advantages having to do with ready accessibility of the stored cassettes, each of transportation thereof, prevention of tape reel rotation in a housing, provision for stacking of multiple pallets, automatic gravity locking of a housing on a pallet, and additional advantages as will appear.

Basically, the invention is embodied in a pallet for stacking like, generally rectangular, magnetic tape containers (cassettes or receptacles therefor) and comprising in combination: a horizontally and longitudinally extending baseplate; parallel, laterally spaced, longitudinally extending upright flanges integral with the plate proximate laterally opposite terminals thereof; upright shoulders carried by the plate and spaced longitudinally thereof to form a longitudinal series of slots into which the containers are downwardly and closely receivable for stacking in upright laterally extending and longitudinally separated condition; and the lateral spacing of a pair of the flanges, projecting downwardly relative to the plate being characterized in that such flanges and the plate may be placed downwardly in straddling relation over the tops of a series of the containers supported in a row by a like lower pallet with the plate seating on the container tops. As a result, the cassettes are readily stackable in position for ease of identification and removal, with the cassette open edges facing downwardly for protection; an upper pallet may be stacked on a row of cassettes supported on a lower pallet; and the pallets may consist of one-piece molded plastic material so as to be fabricated easily and inexpensively.

Additional objects and advantages include: the provision of a housing (typically consisting of molded plastic material) quickly assembled on the pallet and having releasable connection therewith proximate the flanges, the connection being maintained by gravity action during transportation of the housing and pallet by means of a handle on the housing; the provision of a fork removably carried by the housing and having tines projecting into the housing for reception into openings formed by magnetic tape reels carried by the containers in the form of tape cassettes, the tines meshing with reel structure to block reel rotation during transportation; and the provision of other structural details to provide additional advantages to be described.

These and other objects and advantages of the invention, as well as the details of an illustrative embodiment will be more fully understood from the following specification and drawings, in which:

DRAWING DESCRIPTION

FIG. 4 is a fragmentary top plan view of a pallet with cassettes stacked therein;

FIG. 5 is a side elevation of the FIG. 4 pallet;

FIGS. 6A and 6B are top plan and end views respectively of a fork;

DESCRIPTION OF PREFERRED EMBODIMENTS

Figures 1, 2:
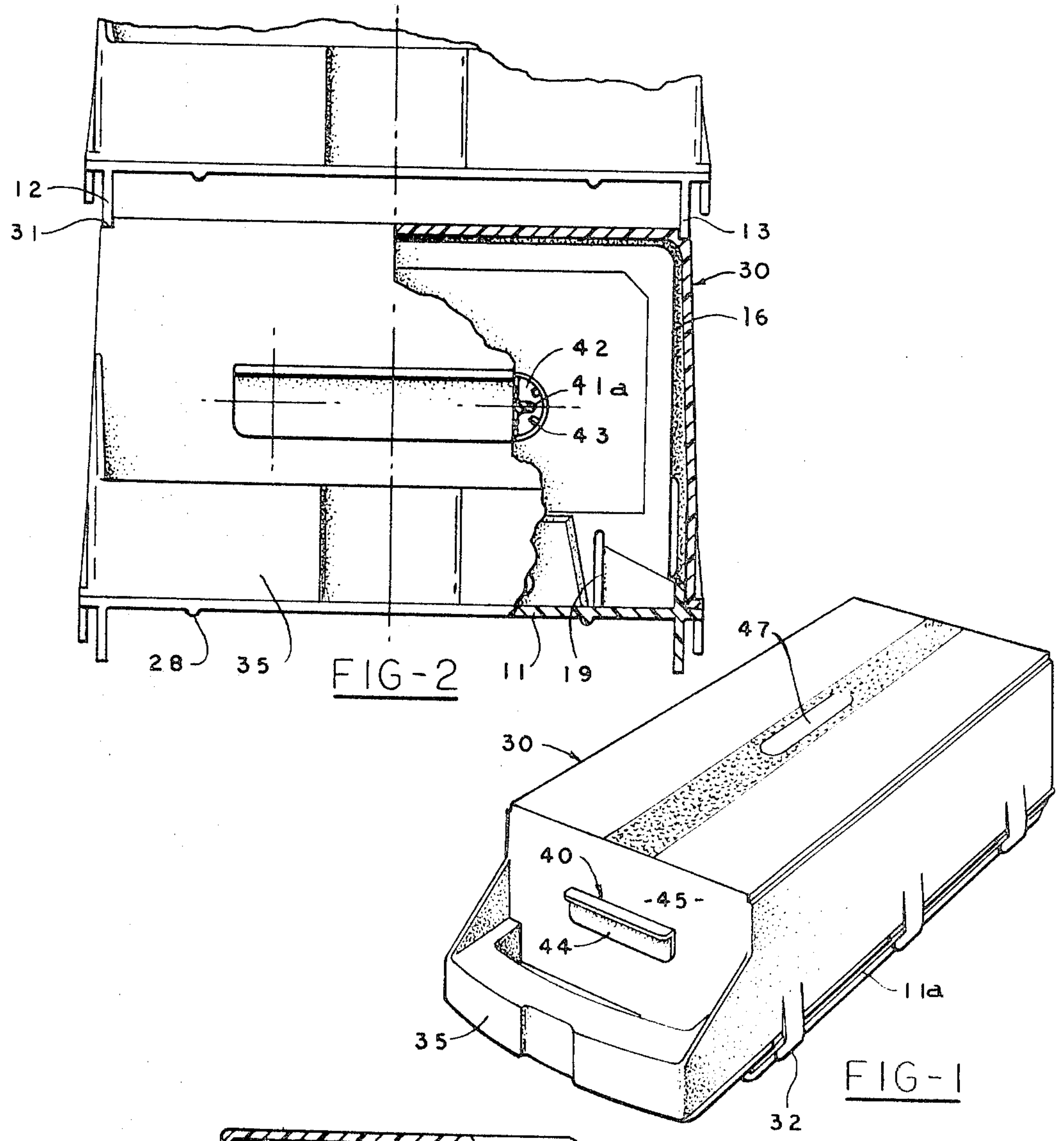
FIG. 1 is a perspective showing of the pallet and housing in assembled condition.
FIG. 2 is an end elevation, partly broken away, of the assembled housing and pallet, with another pallet stacked thereon.

In FIGS. 1—8, a pallet 10 is shown to include a horizontally and longitudinally extending baseplate 11, which is generally rectangular in outline. The pallet also includes parallel, laterally spaced, longitudinally extending upright flanges integral with the plate proximate laterally opposite terminals thereof. Typically of such shoulders are the two laterally spaced flanges 12 and 13 which project downwardly of the plate, and the two laterally spaced flanges 14 and 15 which project upwardly of the plate. Note that the flanges are proximate the laterally projecting opposite side terminals 11A of the plate.

The pallet also carries upright shoulders spaced longitudinally thereof to form a longitudinal series of slots into which magnetic tape containers are downwardly and closely received or receivable, for storage in upright laterally extending and longitudinally separated condition. Such containers in the form of cassettes are shown at 16 in FIGS. 2, 4, 5 and 7 as received downwardly in slots 17. The latter are formed by ribs 18 and upright shoulders 19 on the ribs which are so spaced as to very closely receive there between the opposite faces 20 and 21 of the cassettes. Projecting outwardly from those faces are the raised surface portions 22 and 23 of the cassettes which contain openings 24—27 to receive playback structure in use. Such raised surface portions extend in face-to-face relation between opposite pairs of the ribs 18, as best seen in FIG. 4. Therefore, the cassettes are in effect stored in face-to-face relation to occupy minimum space on an overall basis. Further, the fronts of the cassettes which contain magnetic head receiving openings and exposed tape are protectively confined downwardly toward the pallet baseplate 11. Cutouts 26A may be formed in the plate to save weight and material.

It will be observed that the lateral spacing of the flanges 12 and 13 is characterized in that those flanges may be placed downwardly in straddling relation over the tops of a series of tape containers or cassettes supported in a row by a like lower pallet, with the plate seating on such tops. This feature is clear from FIG. 7, and has the advantage that loaded pallets may be stacked on top of each other, for storage in minimum space. Note that longitudinal ribs 28 may be formed on the underside of plate 11 to slide on the tops of the lower cassettes. It is also clear from FIG. 7 that the lateral terminals 11A of the baseplate may be slidably received in grooves 29 formed by support structure, so that the pallets become shelves for the tape containers. The flanges 12 and 13 may also be supported on a housing 30 for the containers, as is clear from FIG. 2, lending another stacking mode. Note the lowered shoulders 31 on the housing to support the flanges.

Figure 3:
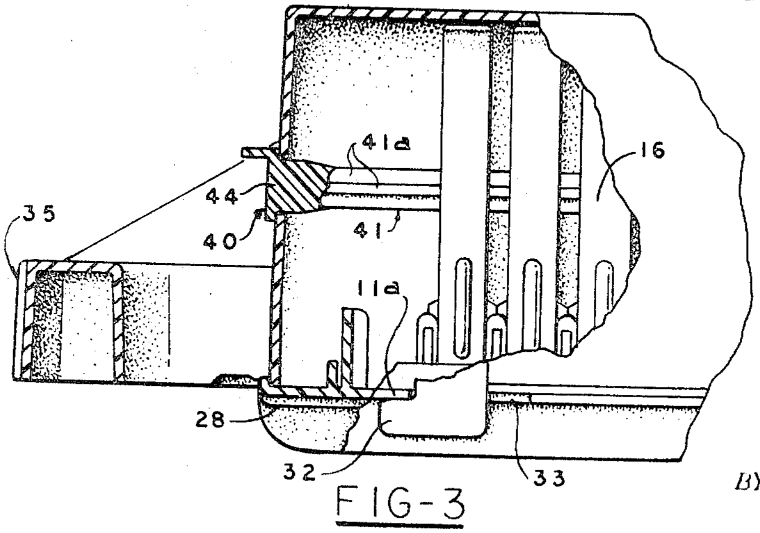
FIG. 3 is a fragmentary side elevation of an assembled housing and pallet, partly broken away to show cassette storage.
Figure 7:
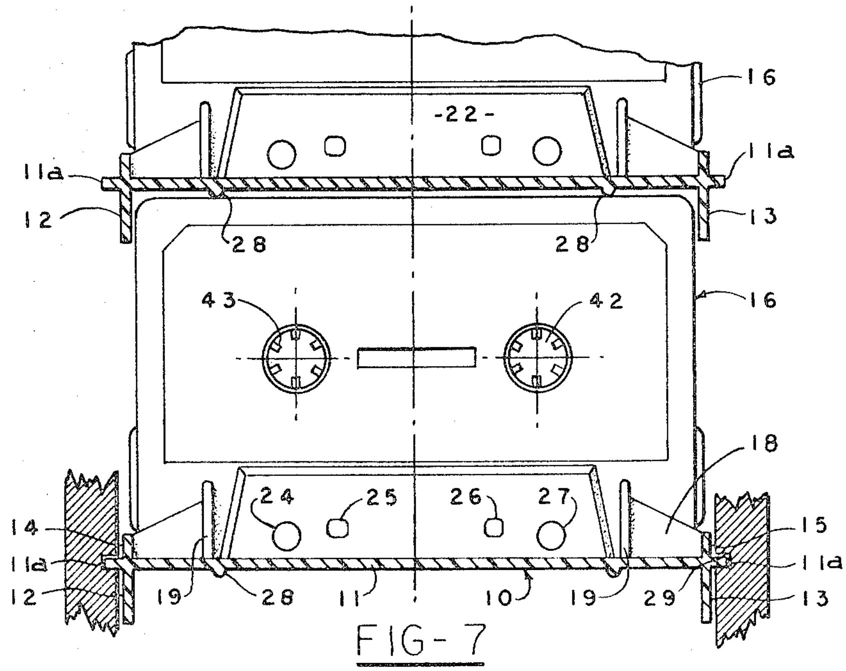
FIG. 7 is an end view of a stored pallet, with housing removed, and showing another pallet stacked onto the cassettes stored on the first pallet.

The housing or cover 30 is formed as a shell, open at the bottom, to fit downwardly over the loaded pallet, and typically to have releasable connection therewith proximate the flanges as described. Such a connection is afforded to unusual advantage by downwardly facing shoulders (the undersides of plate terminals 11A) on the pallet, and by lugs 32 on the housing projecting downwardly and then longitudinally to fit under such pallet shoulders, as for example is illustrated in FIG. 3. Note that the pallet projections or terminals 11A are interrupted at 33 with gap dimensioning to pass the lugs downwardly during housing assembly on the pallet. After such initial assembly, the housing may be lifted as by means of the integral handle 35, thereby to maintain and ensure the positive connection of the pallet and housing during transportation. In this regard, the lugs 32 project freely toward the handle, as is clear in FIG. 3.

FIGS. 2 and 3 show a fork 40 removably carried by the housing and having tines 41 projecting longitudinally into the housing for reception into and through openings 42 formed by aligned magnetic tape reels carried by the containers in the form of tape cassettes 16. The tines are elongated and have ribs 41A sized to mesh with drive structure (as for example internal projections 43) carried by the reels, thereby to block vibration inducted reel rotation. A crosspiece 44 on the fork interconnects the tines and fits against the handle end 45 of the housing so that the fork will remain in place during carriage of the assembly. A tine retainer 49 fits the ends of the tines projecting from the opposite end of the housing.

The pallet and housing may advantageously be made of molded plastic material, the entire pallet formed as a molded unit. An upstanding end plate 46 molded on the baseplate 11 may be used as a support for label application. A top label on the housing may be applied at 47 in FIG. 1.

Upright flanges 14 and 15 are so spaced laterally as to closely receive the opposite ends of the cassettes therebetween, as is clear from Fig. 4. Those flanges also are adapted for stacking of empty pallets, the flanges 12 and 13 of an upper pallet seating downwardly on the flanges 14 and 15 of a lower pallet.

Figure 8:
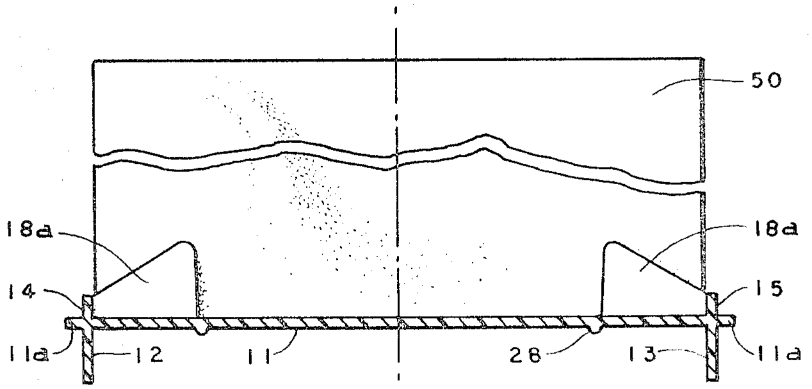
FIGS. 8 and 9 are end and side elevations showing a modified pallet supporting cassette receptacles.
Figure 9:
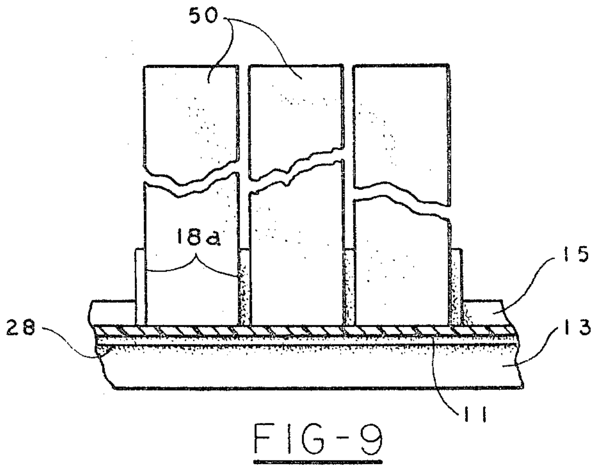

In FIGS. 8 and 9, the pallet construction is generally the same as in FIGS. 1—7; however, the corresponding ribs are spaced apart longitudinally to receive containers in the form of cassette boxes 50 therebetween, the reception being an interfit. The opposite ends of the boxes fit between opposed flanges 14 and 15, as shown.

Referring back to FIG. 7, it will be seen that ribs 28 are spaced apart by a distance lesser than the lateral spacing of the shoulders 19 on laterally spaced ribs 18.

I claim:

1. A pallet in combination with like, generally rectangular magnetic tape containers, comprising a. a horizontally and longitudinally extending baseplate, b. parallel, laterally spaced, longitudinally extending upright flanges integral with the plate proximate laterally opposite terminals thereof, c. upright shoulders carried by the plate and spaced longitudinally thereof forming a longitudinal series of slots, said containers being downwardly and closely received in said slots for stacking in upright laterally extending and longitudinally separated condition;

d. a pair of said flanges projecting downwardly relative to said plate, and e. a housing assembled on said pallet and having releasable connection therewith proximate said flanges but in spaced relation to the lower extremities of said downwardly projecting pair of flanges whereby said pair of flanges may have interfitting relation with a like housing assembled on a like lower pallet.

2. A pallet and housing as defined in claim 1 wherein said containers are in the form of magnetic tape cartridges having magnetic head receiving openings along the lowermost edges thereof.

3. A pallet and housing as defined in claim 2 wherein said containers are in the form of receptacles into which magnetic tape cartridges are received.

4. A pallet and housing as defined in claim 1 including a lifting handle on the housing to maintain said connection by gravity action.

5. The pallet and housing as defined in claim 1 wherein said connection is defined by downwardly facing shoulders on the pallet, and lugs on the housing projecting longitudinally to fit under said connection shoulders on the pallet when the housing is assembled on the pallet.

6. The pallet and housing as defined in claim 4 including a fork removably carried by the housing and having tines projecting into the housing for reception into openings formed by magnetic tape reels carried by said containers in the form of tape cassettes.

7. The pallet and housing as defined by claim 6 wherein said tines are elongated and have ribs sized to mesh with drive structure carried by said reels, thereby to block reel rotation.

8. The pallet and housing of claim 6 wherein said tines are elongated and have ribs sized to mesh with drive structure carried by the reels, thereby to block reel rotation.

9. The pallet and housing of claim 1 consisting of molded plastic material.

10. The pallet and housing of claim 1 wherein others of the flanges project upwardly of the plate, said shoulders being spaced from and between the upwardly projecting flanges.

11. The pallet as defined in claim 4 including a second and like pallet stacked on said housing, the flanges on the second pallet interfitting shoulders on said housing.

12. A pallet in combination with like, generally rectangular magnetic tape containers, comprising a. a horizontally and longitudinally extending baseplate, b. parallel, laterally spaced, longitudinally extending upright flanges integral with the plate proximate laterally opposite terminals thereof, c. upright shoulders carried by the plate and spaced longitudinally thereon forming a longitudinally series of slots, said containers being downwardly and closely received for stacking in upright laterally extending and longitudinally separated condition; and d. the lateral spacing of a pair of said flanges projecting downwardly relative to said plate being characterized in that such flanges and the plate may be placed downwardly in straddling relation over the tops of a series of said containers supported in a row by a like lower pallet with the plate seating on said tops.

13. The pallet as defined in claim 12 including said lower pallet and containers supported thereby which are straddled by said first-mentioned pallet.

14. The pallet of claim 12 wherein said containers comprise magnetic tape cassettes.

15. Pallet structure for stacking and storing like tape cassettes having tape reels defining openings, comprising:

a. a horizontally extending base, b. multiple of said cassettes carried by the baseplate to extend vertically with said reel openings aligned in two rows, c. a housing carried by the base to extend protectively over the cassettes, and d. a fork having parallel tines removably received into said reel openings to block reel rotation in said cassettes.